H. A. APPEL & D. DUNCAN.
APPARATUS FOR TREATING TIMBERS.
APPLICATION FILED SEPT. 1, 1915.

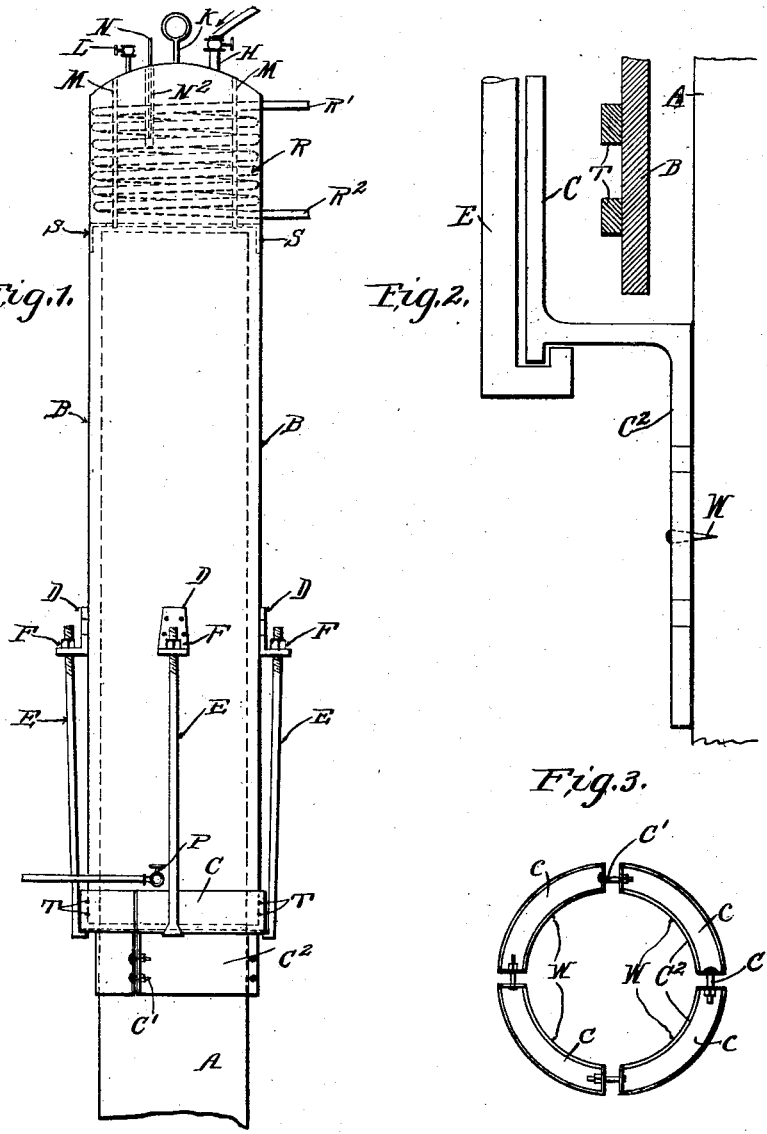

1,220,164.

Patented Mar. 27, 1917.
2 SHEETS—SHEET 2.

WITNESSES:
Fred Rogers
Walton Harrison

INVENTORS
Harris A. Appel
David Duncan
BY
ATTORNEY

UNITED STATES PATENT OFFICE.

HARRIS A. APPEL, OF NEW YORK, AND DAVID DUNCAN, OF BROOKLYN, NEW YORK; SAID DAVID DUNCAN ASSIGNOR TO ELIZABETH O. DUNCAN, OF NEW YORK, N. Y.

APPARATUS FOR TREATING TIMBERS.

1,220,164.     Specification of Letters Patent.     Patented Mar. 27, 1917.

Application filed September 1, 1915. Serial No. 48,441.

*To all whom it may concern:*

Be it known that we, HARRIS A. APPEL and DAVID DUNCAN, both citizens of the United States, the former residing in the borough of Manhattan, county, city, and State of New York, and whose post-office address is No. 90 Wall street, New York, N. Y., and the latter residing at No. 127 East Eighteenth street, in Brooklyn, in the county of Kings and State of New York, have invented new and useful Improvements in Apparatus for Treating Timbers, of which the following is a complete, clear, and exact description.

More particularly stated our invention relates to devices for use in connection with timbers to be treated in order to preserve them, the purpose of our invention being to facilitate the application of a liquid preservative to the body of a predetermined portion of a timber such as a pile, in such manner that the preservative is forced by artificial pressure into the pores of the timber for an appreciable distance from the outer surface thereof.

Our invention is especially adapted for use upon wooden piles which have already been driven, and which consequently are standing upright, each having an end portion exposed in suitable position to be impregnated with a preservative in liquid form.

Our invention may assume a large number of different forms, all of which we do not deem it essential to describe. For the sake of conciseness, therefore, we will describe only two specific forms of our apparatus, it being understood that reasonable variations may be made therefrom without departing from the spirit of our invention.

Reference is being made to the accompanying drawings forming a part of this application, in which like letters indicate like parts.

Figure 1 is a side elevation showing one form of our device, which is temporarily mounted upon the upper end of a wooden pile and employed in connection with a source of supply of preservative in a liquid form and under pressure, for the purpose above stated.

Fig. 2 is a detail view, partly in elevation and partly in section, of parts appearing in Fig. 1, near the bottom thereof.

Fig. 3 is an inverted plan of a collar made up of sections and shown in the lower portion of Fig. 1.

Figure 4:
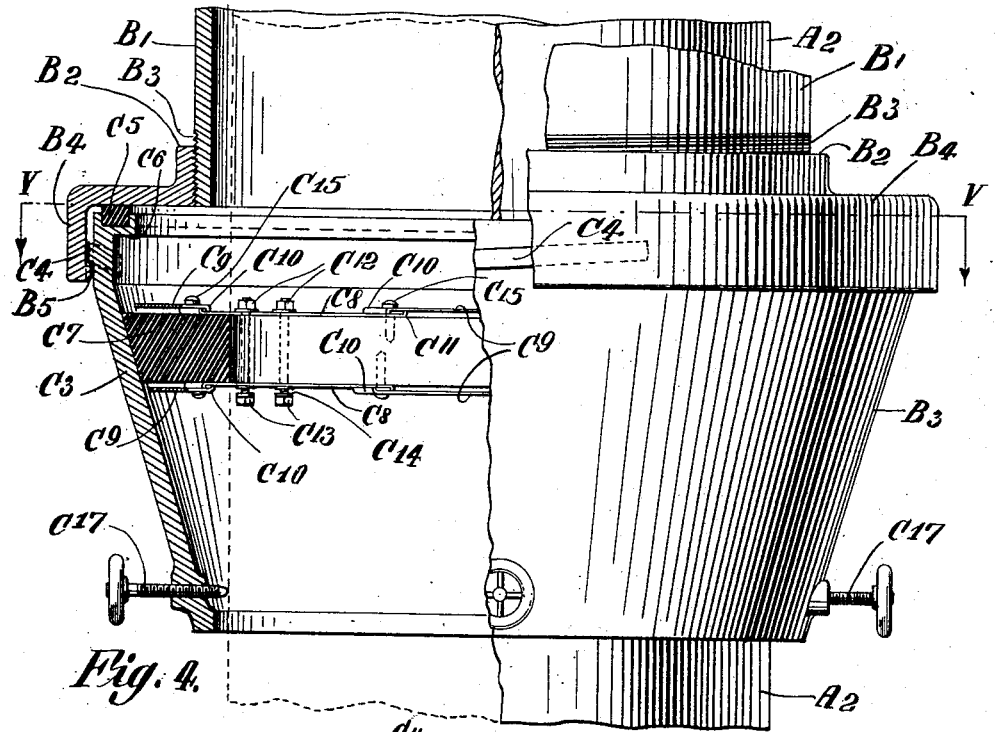
Fig. 4 is a view, partly in elevation and partly in section, showing another form of our device, which may, if desired, be used under water.

A timber to be treated is shown at A, and in this instance is merely a wooden pile, disposed vertically. A seamless cylinder B, made of metal and closed at its upper end, covers the upper portion of the pile.

A number of separate collar sections C are connected together by bolts $C^1$ and severally provided with bearing portions $C^2$ each of arcuate form and adapted to fit against the outer surface of the timber A. Each bearing portion $C^2$ carries a spur $w$, located internally thereof for engaging and slightly entering the timber, the several spurs $w$ being thus collectively adapted to hold the collar as a whole securely in position. The collar sections C together form a circular trough-like member concentric with the outer surface of the timber and spaced therefrom, as may be understood from Figs. 1 and 2. The sectional form of this member gives it a certain amount of flexibility whereby it fits neatly upon the pile regardless of irregularities in the form thereof.

A number of lugs D are severally riveted upon the outer surface of the cylinder B and spaced apart, the bottom portion of each lug extending laterally outward. A number of dogs E are threaded through these lugs, each of which for this purpose has its bottom portion formed into an eye. Each dog E is substantially L-shaped at its bottom end, which is thus adapted to serve as a hook for engaging and supporting the collar made up of the collar members C. The upper ends of the dogs E are threaded and fitted with nuts F, so that by turning these, the dogs E are raised or lowered and thus adjusted.

A valve H is used to supply a quantity of liquid preservative, such as creosote, carbolineum, or any preservative oil, into the cylinder. The valve H is connected with a source of supply, not shown, of this liquid preservative, and such source of supply is under pressure. A valve P is used for emptying the cylinder after its use upon a pile.

In order to facilitate lifting and lowering the cylinder B we provide it with a ring K located at its upper end as shown in Fig. 1. A jet valve L is used for testing for the presence of the preservative oil within the top of the cylinder, or for liberating small quantities of such oil for any purpose; for instance to enable its condition to be observed during the process. A thermometer appears at N and is located within a well $N^2$.

Located within the upper end of the cylinder B is a steam coil R, and connected with the same is an inlet pipe $R^1$ for admitting steam, and an outlet pipe $R^2$ for removing water of condensation.

Located within the upper portion of the cylinder B and secured rigidly thereto are a number of L-shaped lugs S, which are adapted to engage the upper end of the pile in order to support the weight of the cylinder, and all parts secured to it. The lugs S are spaced a sufficient distance from the top of the cylinder to leave room for the steam coil R, so that this steam coil can not be injured by handling the cylinder B in the manner described.

Mounted rigidly upon the cylinder B and located adjacent the lower end thereof are rings T which serve as anchorages as hereinafter described.

The operation of the device shown in Figs. 1, 2 and 3 is as follows:—

The parts being assembled and arranged as above described and as shown, the parts are adjusted as indicated in Fig. 2, so that the lower end of the cylinder B is a little above the horizontally disposed portion of the collar built up of sections C. The cylinder B need not, and usually does not, fit closely upon the pile A, nor does the cylinder B touch any part of the collar. Plaster of Paris, wet up and reduced to a plastic state, is now poured into the trough-like member made up of sections C and is allowed to harden or solidify. The plaster of Paris thus forms an oil-tight joint between the lower end of the cylinder B and the timber A. The heating coil R being now heated by steam, and the liquid preservative being admitted under pressure into the cylinder B as above described, a quantity of the preservative is thus forced into the pores of the timber. The net result is that the timber, for a distance reaching from its upper and to at least the bottom of the cylinder, is impregnated with the preservative.

Figure 5:
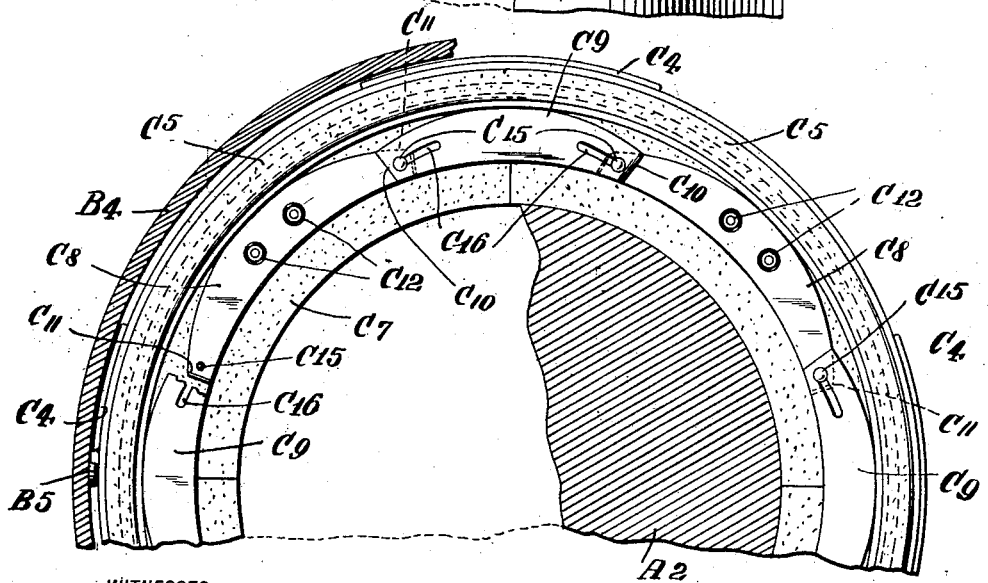
Fig. 5 is a fragmentary plan of the mechanism shown in Fig. 4.

In the form shown in Figs. 4 and 5, we have a structure suitable for use in treatment of timbers the upper ends of which are under water.

The wooden pile $A^2$ supports a metallic cylinder $B^1$ which is analogous to the cylinder B above described. Mounted upon the lower end of the cylinder $B^1$ is an annular collar $B^2$, held in position by a thread $B^3$. The collar $B^2$ carries an annual flange $B^4$ extending outwardly and downwardly from it, the flange being provided internally with a number of lugs $B^5$ (in this instance four) each having in cross section a substantially semi-cylindrical form, its curved side being uppermost, the lugs being spaced equidistant.

A collar $C^3$ is made of metal, and has the general proximate form of a cone frustum. This collar carries a number of cam lugs $C^4$ equal to the number of lugs $B^5$, and each serving as a mutilated thread. That is to say, each cam lug $C^4$, which is integral with the collar $C^3$, is disposed spirally upon the collar, so that by turning the cylinder $B^1$ relatively to the collar $C^3$, the lugs $C^4$ can be brought under and forced hard against the cam lugs so as to lock the cylinder $B^1$ and collar $C^3$ firmly together.

A rubber gasket is shown at $C^5$, and is carried in a groove $C^6$, the normal thickness of the gasket being greater than the depth of the groove, so that the top of the gasket is engaged by the adjacent portion of the flange $B^4$. A tight joint is thus formed between the flange $B^4$ and collar $C^3$.

Engaging the inner surface of the collar $C^3$, and normally loose relatively thereto is a rubber packing made in sections $C^7$, the outer surface of each of these sections being of proper form to fit the inner surface of the collar $C^3$. The packing as a whole has a general annular form, and carries a number of metallic strips $C^8$ and $C^9$, each strip $C^9$ slightly overlapping the two adjacent strips $C^8$ and being slidable relatively thereto. The ends $C^{10}$ of each strip $C^9$ are bent toward the rubber packing, and the ends $C^{11}$ of each strip $C^8$ are bent away from the rubber packing. The strips $C^8$ are held in position upon the packing sections $C^7$ by bolts $C^{12}$ carrying nuts $C^{13}$ and spring washers $C^{14}$.

Each strip $C^8$ is provided adjacent its ends with pins $C^{15}$ which extend through slots $C^{16}$ with which the strips $C^9$ are provided. There are two sets of the strips $C^8$ and $C^9$, one set being upon the upper face of the packing, and the other set being upon the lower face thereof.

The rubber gasket is thus collapsible, or at least adapted to fit piles of different diameters.

Screws $C^{17}$ are provided with the purpose of engaging the pile in order to prevent the collar from slipping relatively thereto.

Owing to the form of the collar $C^3$, whenever the packing within it is forced downwardly the packing is contracted in its cross diameter, and thus tends to make a tight fit to both the pile and the collar.

The operation of the mechanism shown in Figs. 4 and 5 is as follows:—

The parts being assembled as shown and described, the collar $C^3$ and the cylinder $B^1$ are lowered over the top end of the pile which, as elsewhere indicated, may or may not be under water. The screws $C^{17}$ are now tightened against the pile, and the cylinder $B^1$ and flange $B^4$ are as a unit rotated slightly in relation to the collar $C^3$. The lugs $B^5$ are thus forced hard against the cam lugs $C^4$, so that the cylinder $B^1$ and collar $C^3$ are forced together and the gasket $C^5$ is thus compressed and a tight joint formed as between the cylinder $B^1$ and collar $C^3$.

Next a fluid under pressure, such for instance as compressed air, is admitted into the cylinder $B^1$, at the top thereof. The pressure of this fluid forces downwardly the packing made up of sections $C^7$ and parts carried thereby, this packing being thus caused to make a tight fit with both the inner surface of the collar $C^3$ and the adjacent outer surface of the pile. This done, the fluid is permitted to escape from the cylinder.

Next the liquid preservative is admitted into the cylinder substantially as above described with reference to the cylinder B, under conditions of heat and pressure, so that the upper portion of the pile, for a length at least equal to the length of the cylinder, is impregnated with the liquid preservative. The depth of penetration of the liquid preservative into the pores of the wood is commensurate with the degree of pressure, the length of time it is applied, the fluidity of the liquid, the porosity of the timber operated upon, etc.

The timber being impregnated, the liquid is emptied out, the cylinder is removed to another pile, and the operation is repeated.

We do not limit ourselves to the precise mechanism employed, as variations may be made without departing from the spirit of our invention.

What is claimed and what is desired to be secured by United States Letters Patent is:—

1. An apparatus for treating timbers, comprising a chambered member closed at one end and adapted to inclose a part only of the timber to be treated, a plurality of permanent separate sections of resilient material disposed end to end so as to form an annular packing, means for holding said sections in substantially the same plane, an inclosing member engaging the outer edge of said packing and thus co-acting with said packing in order to render the same fluid-tight, and means for introducing a liquid preservative into said inclosing chambered member.

2. An apparatus for treating timbers, comprising means forming a chamber closed at one end and adapted to inclose a part only of the timber to be treated; a plurality of permanent separate sections of resilient material disposed end to end so as to form an annular packing; means for holding said sections in substantially the same plane; an inclosing member having a conical wall engaging the outer edges of said sections of resilient material and thus coacting therewith when internal pressure is applied to render the packing fluid-tight against the timber; and means for introducing the liquid preservative into said inclosing chamber.

3. An apparatus for treating timbers, comprising a chambered member closed at one end and adapted to inclose a part only of the timber to be treated, a plurality of separate sections of resilient material disposed end to end so as to form an annular packing, encircling the timber, a plurality of metallic plates carried by said annular packing and so disposed that one of said plates overlaps another and is slidable relatively thereto in order to guide said packing sections as said packing is contracted, an inclosing member connected fluid-tight with said chambered member and provided with an internal bore which tapers and which engages the outer peripheral edge of the packing, provisions for shifting said packing relatively to the inclosing member in order to render the packing fluid-tight relatively to the timber and to the inclosing member, and means for introducing into the inclosing member a liquid preservative under pressure.

In witness whereof, we have signed our names to this specification, in the presence of two subscribing witnesses.

HARRIS A. APPEL.
DAVID DUNCAN.

Witnesses:
 HENRY SCHWED,
 WALTON HARRISON.

Copies of this patent may be obtained for five cents each, by addressing the "Commissioner of Patents, Washington, D. C."